Jan. 3, 1967    J. CORDIER    3,295,955
SMELTING METHOD AND DEVICE
Filed May 12, 1964    3 Sheets-Sheet 1

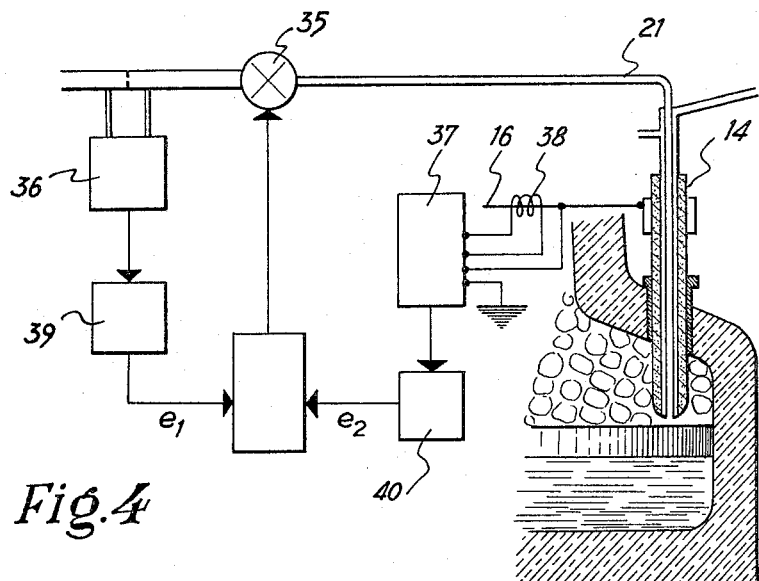
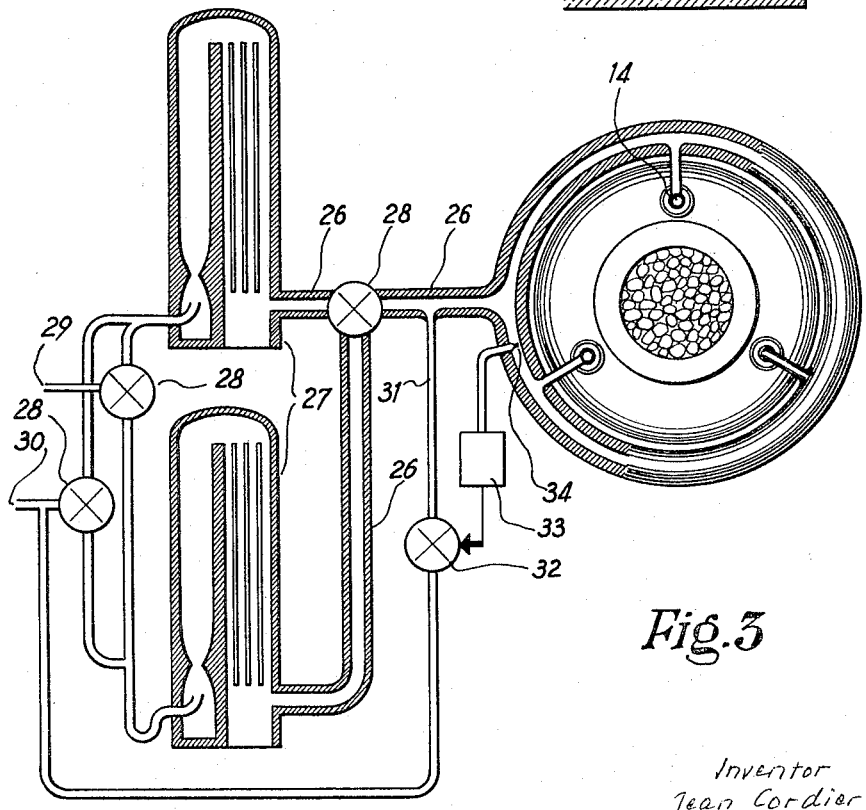

3,295,955
SMELTING METHOD AND DEVICE
Jean Cordier, Tunis, Tunisia, assignor to Institut de Recherches de la Siderurgie Francaise, Saint Germain-en-Laye, France
Filed May 12, 1964, Ser. No. 366,834
Claims priority, application France, Feb. 14, 1959, 786,759, Patent 1,226,532; Aug. 1, 1959, 801,789, Patent 1,242,894; Aug. 3, 1959, 801,848, Patent 1,241,196; Nov. 17, 1959, 810,351, Patent 1,249,437
11 Claims. (Cl. 75—11)

The present invention relates to a smelting method, and more particularly to the smelting of iron bearing materials, for instance iron ores, in an electric arc furnace.

The present application is a continuation in part of our co-pending application Serial No. 8,458, filed February 12, 1960, now abandoned, and entitled "Smelting Method and Device."

Considerable difficulties are encountered when it is attempted to produce pig iron or the like from iron bearing materials in an electric arc furnace with a shaft. The amount of gases formed in such apparatus is relatively small and thus little pre-heating of the material takes place before the same is subjected to the electric arc. Consequently, the reduction of iron bearing materials by gases which occurs prior to reaching the electric arc zone, is insignificant. Various modifications of the method of smelting iron bearing materials in electric furnaces were tried, however, it was not possible up to now to overcome the disadvantages which were connected with and believed to be inherent in the use of an electric furnace for this purpose.

It is therefore an object of the present invention to provide a smelting method including electric arc treatment of an iron bearing charge which overcomes the prior art difficulties and disadvantages of electric arc smelting.

It is another object of the present invention to provide a method by means of which electric arc smelting can be carried out in a simple, economical and reliable manner.

Other objects and advantages of the present invention will become apparent from a further reading of the description and of the appended claims.

With the above and other objects in view, the present invention contemplates a method of smelting ferrous ore, comprising the steps of heating and agglomerating the ore in an oxidizing atmosphere so as to oxidize the same and to form a hot oxidized agglomerated ore charge, passing the hot charge in countercurrent flow to hot reducing gases through a reducing zone of an electric arc furnace so as to partially reduce the charge, subjecting the partially reduced charge in the electric arc furnace to an electric arc so as to complete reduction of the charge and to separate the same into molten ferrous metal and slag with the help of a fluid reducing agent containing carbon and hydrogen and injected into the furnace through the electric arc, and recovering the molten ferrous metal from the electric arc furnace.

The process of obtaining molten ferrous metal from iron bearing materials according to the present invention may be carried out in an electric arc furnace having an upper shaft portion, and a lower hearth portion in which the electric arc is formed, by forming a mixture of ferrous ore and fluxing material, heating and agglomerating the mixture in an oxidizing atmosphere so as to obtain an oxidized hot agglomerated charge, introducing the charge in hot condition, i.e. without appreciable loss of heat, into the furnace at the upper end thereof, allowing the charge to pass downwardly through the shaft portion and into the hearth portion of the furnace in countercurrent flow to hot reducing gases so as to partially reduce the charge in the upper shaft portion before the same reaches the hearth portion, subjecting the partially reduced charge in the hearth portion to an electric arc so as to complete reduction of the charge and to form a layer of molten ferrous metal and slag and separating the molten ferrous metal from the slag, while injecting fluid reducing agents through the electric arc so as to generate said hot reducing gases which partially reduce the charge in the shaft portion of the furnace.

The said reducing agents containing carbon and hydrogen are preferably hydrocarbons, as natural gas or fuel-oil, or products issuing from thermal cracking thereof.

Broadly, the ore smelter may comprise, in combination, an electric arc furnace including a hearth section and at least one elongated shaft section superposed and communicating with the hearth section, the hearth section being provided with electric arc forming means including a plurality of electrodes, at least one of said electrodes being formed with an interior conduit for injection of fluid reducing agents through the arc, and the shaft section having a lower end portion communicating with said hearth portion and an upper end portion being adapted to receive a hot agglomerated ore charge; ore treating means for heating, sintering and oxidizing an ore containing charge, and conveying means operatively connected to the charge treating means and to the upper end of the shaft section for passing said hot charge from the charge treating means into the upper end of the shaft section, whereby the charge will be heated, oxidized and agglomerated and the thus treated charge will pass downwardly through said shaft section into the hearth section of the electric arc furnace in countercurrent flow to the reducing gases thus being partially reduced prior to being subjected to the electric arc formed in the hearth section.

Thus, according to the present invention, part of the reduction of the metal oxides is carried out in the shaft of the furnace by means of the hot reducing gases flowing from the hearth chamber of the electric arc furnace, where they are prepared by the action of the electric arc on the fluid reducing agents introduced therethrough.

This is accomplished by pre-heating the charge in an agglomerating apparatus, for instance a continuous strand, or a sintering rotary kiln, in an oxidizing atmosphere, and at such a temperature that subsequent reduction by means of reducing gases will be possible in all portions of the shaft of the furnace. In fact, there is a critical range of temperature for the reduction, that is in the 800–1150° C. range, often around 825° C. Below that critical temperature, the reaction is slow, and above it is very fast but the material is sticky. Since in a conventional electric furnace the ratio of the calorific mass of the ascending gases to the calorific mass of the descending solid materials is rather low, 0.5 or less, it is impossible to heat the whole charge present in the shaft with the gases. This is contrary to the common opinion. In fact the thermal gradient is steep towards the bottom, and the reaction begins only at a very low level in the shaft and cannot be economically ended in the hearth.

In order to overcome this physical limitation, the present invention contemplates introduction in the upper part of the shaft of agglomerated ore at a temperature in the range extending from 800° C. to 1150° C. In that way, the reaction may start immediately at the top and the shaft is effectively and economically used for reduction.

Another advantage of this process is the thermic gain in the furnace which corresponds to the sensible heat of the charge when introduced into the furnace and also to a great saving in power consumption without any relation with the relatively small differences in sensible heat involved when agglomerated ore is introduced in the shaft above the critical temperature. I have proved by experiment that if sintered ore is introduced at a temperature below 700° C., it is impossible to work with hydrocarbons as reducing agents. In that case it is necessary to operate with at least 1700 kg. of coke and 2000 kwh. per metric ton of Fe. If sintered ore is introduced at a temperature above 800° C., it is possible to operate with hydrocarbons. With cold methane, for instance, the power consumption may be as low as about 1200 kwh. with 250 Nm.$^3$ of $CH_4$, per metric ton of Fe. This is a further and unexpected advantage of the process.

The present invention allows the use as reducing agent of liquid or gaseous hydrocarbons, thereby avoiding the disadvantages usually incurred when hydrocarbons are used in a reducing process, such as clogging of pipes used for supplying of hydrocarbons with carbon formed by premature partial cracking, or disadvantages due to the fact that the cracking is an endothermic phenomenon. In order to obtain from the method all its advantages, it is essential that the reducing agents be injected into the hearth through the electric arc. The best way to do this is to inject these agents through at least one axially hollow electrode. The passage of the reducing agents through the electric arc provides a very good preparation thereof; an important preheating takes place along with a complete gasification; at the same time free radicals are formed, as monoatomic hydrogen, and that improves substantially the reducing potential of the gases flowing upwardly in the shaft and the heat transfer from the arc to the charge, due to the dissociation energy of the molecules that is absorbed in the arc and given back at a higher level in the shaft.

A further very important and unexpected advantage of my process is the following: owing to the perfect preparation of the reducing agents for the reduction work they will perform in the hearth and in the shaft, the reactions are effected without delay and no reducing material is stored in the furnace. This allows a practically instantaneous control and adjustment of the conditions in the hearth by controlling the electric power of the arc and the flow rate and/or composition of the reducing agents injected through the arc. It is therefore possible operate the process so as to obtain a "cold operation" described below without risking a catastrophic cooling off of the melt in the hearth, for it is possible to compensate immediately for any perturbation or variation in the operation of the process.

According to the present invention liquid ferrous metal is produced in an electric furnace with a shaft, by sintering and pre-heating iron ore and flux in an oxidizing atmosphere in order to obtain an oxidized and hot charge. The hot charge is then introduced without any substantial heat loss, into a frustoconical shaft surmounting the hearth of the electric arc furnace used for reduction and smelting. The charge is partially reduced in the shaft by means of hot reducing gases which traverse the shaft upwardly from the hearth towards the upper end of the shaft in countercurrent to the descending charge. Reducing agents containing carbon and hydrogen are introduced into the hearth through the electric arc to form the hot reducing gases traversing the shaft upwardly and to cause reduction in the hearth and in the shaft and carburation of the metal. The reduction of the charge is completed in the hearth and the same is melted under the action of the electric arc, thereby separating the liquid metal from the slag or molten gangue.

The process of the present invention also may include some of the following features:

(a) Some of the reducing agents introduced into the furnace may be liquid or gaseous hydrocarbons, which are cracked in the electric arc. Gaseous hydrocarbons are introduced through at least one longitudinally hollow electrode. Liquid hyrocarbons may be atomized in a carrying gas such as natural gas, air, oxygen, etc.

(b) Some of the reducing agents introduced into the furnace may be liquid or gaseous hydrocarbons, whose cracking is effected almost completely outside of the furnace, in special cracking chambers.

(c) The external cracking of hyrocarbons may be carried out in at least two chambers of regenerator type, which chambers are used alternatively for the cracking phase and the heating phase.

(d) In the event of intermittent external cracking, in special chambers, the varying temperatures of the products of cracking introduced into the electric furnace may be compensated by injections of cold gaseous hydrocarbons in variable quantities depending on the temperature of the simultaneously introduced cracked gases in such a manner as to maintain the thermic equilibrium of the furnace at all times.

(e) The liquid metal in the hearth may be maintained at a constant level.

(f) When treating ores which are only slightly reducible, such as are involved in the production of ferroalloys, the reducing agents introduced into the electric furnace preferably have a ratio of hydrogen by weight to carbon by weight equal at the most to 0.20.

(g) When treating ores which are easily reducible and are to be used for the production of pig iron, the reducing agents introduced into the electric furnace preferably contain together a ratio of hydrogen to carbon within the range of 0.15 to 0.40 (by weight).

(h) When treating ores which are easily reducible and are used for the direct production of steel, the total quantity of reducing agents introduced into the electric furnace preferably should have a ratio by weight of hydrogen to carbon equal to at least 0.60.

(i) In order to produce pig iron containing less than 0.4% of silicon, the electric furnace should be operated in a "cold operation" by injecting hydrocarbons in each electric arc, in a quantity directly proportional to the electric power consumed by this arc, and the manganese oxide (MnO) content in the agglomerate should be equal to at least 1.5% in order to avoid dangerous temperature fluctuations and to maintain a stable "cold operation."

The novel features which are considered as characteristic for the invention are set forth in particular in the appended claims. The invention itself, however, and its method of operation, together with additional objects and advantages thereof, will be best understood from the following description of specific embodiments when read in connection with the accompanying drawings in which:

FIG. 3 is a plan, cross-sectional view of a device for injection of cracked hydrocarbons through the electrodes; and FIG. 4 is a schematic representation of automatic equipment for adjusting the quantity of reducing agents injected in the arc in relation with the instantaneous electric power in the arc.

Figure 1:
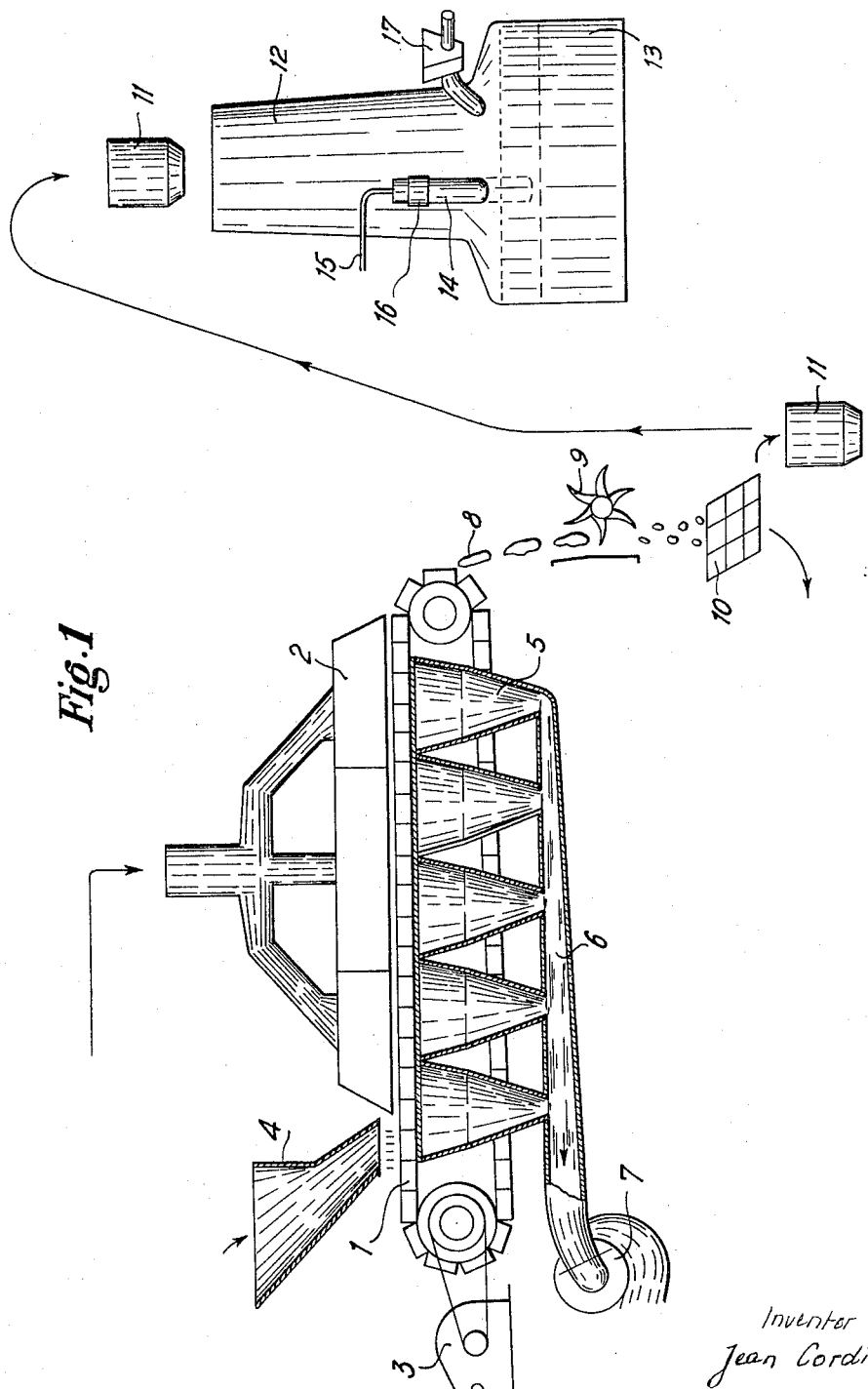
FIG. 1 is a schematic view of an arrangement according to the present invention.

Referring now to the drawings, and particularly to FIG. 1 the operation of the process according to the present invention will be explained by reference to the illustrated device which includes an endless sintering strand, known per se, equipped with a hood 2 for conveying a pre-heated fluid, for instance, hot air. The chain conveyor is operated by motor 3. The loading device is designated by 4. Wind-boxes 5 lead to main smoke conduit 6 which communicates with exhaust fan 7.

After leaving the sintering strand, the sinter 8 is broken by sprocket-wheel 9 and passes through a conventional sifting device 10. The charge is then dropped into insulated buckets 11 and conveyed to the upper open end of shaft 12 of the electric furnace, located above hearth 13. FIGURE 1 shows one of a plurality of electrodes 14 receiving pulverized, liquid or gaseous hydrocarbons at 15 and obtaining electric power through electric cables 16. Gaseous hydrocarbons, such as natural gas for instance are simply introduced under a suitable pressure through an axial conduit bored in the electrode 14. The flow rate may be controlled by a conventional flow meter and regulator as commonly practiced in the art. Liquid hydrocarbons, such as fuel-oil, are suspended in finely subdivided form in a carrying gas, and introduced in this state like a gas. A device for feeding complementary lumped materials like small quantities of solid additional fuel, fluxing or alloying materials, is designated by reference numeral 17.

Figure 2:
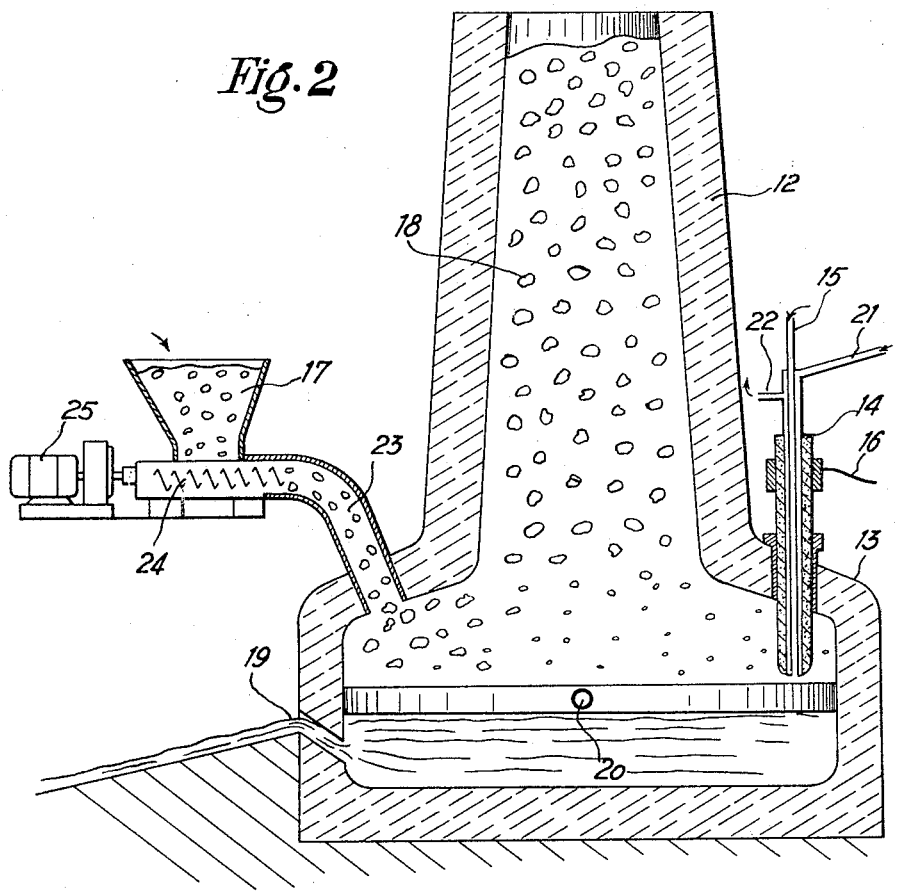
FIG. 2 is an elevational axial section of the electric furnace shown in FIG. 1, but on a larger scale.

FIG. 2 illustrates the electric furnace of FIG. 1 in more detail. Reference numeral 18 designates the sinter which is loaded into the shaft and which descends into the hearth 13 which has a tap hole 19 for liquid metal and a tap hole 20 for the slag. The dome of the hearth is pierced by three hollow electrodes 14, which are cooled by water introduced at 21 and leaving at 22. The dome is also traversed by three gas-tight spouts 23, each extending from the base of the hopper or bin 17 containing solid additional material. The solid material is pushed into the hearth by screw 24, which is activated by motor 25. A lock chamber, which is not illustrated, provides gas-tightness, so that the gases in the hearth cannot escape through feeding device 17.

The following is a description of phenomena and chemical reactions taking place in the furnace.

The liquid or gaseous hydrocarbons are introduced in the hearth by the hollow electrodes through the arc. They are cracked if they were not cracked prior to reaching the furnace. By flowing through the electric arc, they are subjected to an important pre-heating and a very complete gasification occurs. At the same time the hydrogen is liberated and free radicals, such as monoatomic hydrogen, are formed. The carbon is dissolved in the pig iron to a great extent and the portion of it which does not so react is deposited on solid surfaces. The carbon dissolved in the pig iron and the carbon deposited on solid surfaces performs the final reduction of the slag as well as the reduction of oxides which were not reduced in the shaft and an eventual carburation of the liquid metal. By this reduction carbon monoxide is formed which, when mixed with hydrogen, produces the gas which performs the reducing operation in the shaft. The perfect conditioning in the arc of the liberated hydrogen, that is intense pre-heating and liberation of free radicals, improves substantially the heat transfer from the arc to the charge, owing to the dissociation energy of the molecules that is absorbed in the arc and given back in the shaft. It results in a lower temperature in the arc and a higher temperature in the shaft than in previously known processes.

These conditions are particularly favorable so that the reduction is rapid and complete. The oxides are at a higher temperature than the critical temperature referred ot herein above (800 to 1150° C.) and the gases have such a composition, containing little, if any, nitrogen and being a mixture of CO and $H_2$, that the reactions are rapid and that the composition of the gases is close to the reduction equilibrium. The gases are therefore well utilized and, if they leave hot, this loss is small from a thermal point of view, because their volume is small.

In the zone of the electric arcs, the hot products which are partially reduced, are melted. Iron is again incorporated in the pig iron, the still ferrous slag is reduced by the carbon dissolved in the pig iron. Pig iron and the slag are tapped separately. The thermal level of the hearth, the composition of pig iron and of slag, i.e., the degree of reduction is controlled by the quantity of electricity which is admitted and the quantity and the composition of the injected hydrocarbons. In this manner it is possible to produce conventional pig iron, pig iron with low carbon content, steel and ferro-alloys.

As mentioned already earlier, the total weight of reducing agents per one ton of pig iron, is considerably lower than the corresponding weight in conventional electric furnaces. Moreover, a considerable and unexpected advantage is brought by the perfect preparation of the reducing hydrocarbons for the reduction work they are to perform in the hearth and in the shaft. In effect, the reactions are effected without delay and no reducing material is stored in the hearth. This results in a quasi instantaneous control and adjustment of the conditions in the hearth by varying flow rate or composition of hydrocarbons, or electric power, or both. Of course, the amount of injected hydrocarbons can be varied in order to regulate rapidly the operation of the furnace and the composition of the produced pig iron. Moreover, the preheating of the ore on the sintering strand and the prereduction in the shaft allow to limit the amount of electric energy consumed by the electric furnace to the amount of heat necessary in order to melt the products, to crack and pre-heat the injected hydrocarbons and to perform the final reduction.

Since the production of an electric furnace is limited by the amount of kilowatts which it can absorb, therefore, the described process fully utilizes the productive capacity of the electric furnace without requiring complex operations with correspondingly high capital investment.

The use of cracked and hot hydrocarbons, for instance, of natural gas, instead of cold hydrocarbons, allows to reduce considerably the thermal requirements at the level of the hearth and thus to lower the consumption of electricity, gaining the advantages connected with it, particularly the possibility to construct units of increased capacity. It should be noted that all reducing processes employing hydrocarbons are hindered by the fact that the dissociation of the said hydrocarbons is an endothermic phenomenon; the achievement of this dissociation or cracking, in a reducing apparatus, or before it, requires, therefore, an addition of heat, which is not necessary when the reducing process is performed with gases, which ab initio have a reducing effect, like carbon monoxide or hydrogen, or with carbon.

This phenomenon is particularly important in the case of methane, the dissociation heat of which is more than one therm per kilogram, which is so much the more regrettable when this gas, main component of natural gas, is the hydrocarbon most readily and economically available for metallurgical needs. In order to obviate these disadvantages, in an economical manner, the cracking of the hydrocarbons is effected outside of the metallurgical apparatus, and the cracked hydrocarbons are then introduced in the arc. This cracking can be effected in two or more cracking chambers, which are placed alternatingly in the heating phase or the operating phase. These cracking chambers are similar to regenerators of blast furnaces and can be heated by any available hot gas such as waste gases; but this is not absolutely necessary and these chambers can take any form which is suitable for their functioning.

If the hydrocarbons are cracked at the outside of the metallurgical apparatus, in cracking chambers with intermittent operation, as described above, it is obvious that the temperatures of the cracked gases will be variable, the chamber in operating phase getting successively cooler until it is placed again in the heating phase. In order to maintain a thermic equilibrium in the furnace despite these variations in temperature, cold and uncracked hydrocarbons are injected at the nose of the electrodes, in the zone of the arcs, in variable or intermittent flow, depending on the temperature of the cracked gases.

An application of the process will be understood easily with the aid of FIG. 3, wherein insulated pipes 26 are shown leading from cracking chambers 27. These chambers 27 are placed alternatively in a heating phase and in a cracking phase by means of reversing valves 28 which send into each chamber alternatively a heating gas arriving at 29 and methane (natural gas) which arrives at 30. The pipe 26 envelops the shaft 12 of the electric furnace, it communicates with the interior conduit 15 of the three electrodes 14. In order to compensate for the variable temperature of the cracked products, cold methane is mixed with them in the pipe 26 by means of a pipe 31 and a control valve 32. The cold methane is heated and cracked at once in the pipe 26 and the result is a mixture of cracking products at a lowered temperature depending upon the quantity of cold methane introduced. The thermal equilibrium of the furnace may be obtained in a very simple way by controlling the flow rate of cold methane by means of the valve 32 and a temperature regulator 33 with a temperature sensitive element 34, a thermocouple for instance, arranged in the circular pipe 26. The total flow rate of methane is maintained constant at 30 by a conventional flow rate meter and regulator, not shown.

It is desirable to maintain the surface of the molten material in the hearth at a nearly constant level, despite the continuous influx of deoxidized metal and the discontinuous tapping. This may be done in a known way by means of a gas-tight fore-hearth in which over-pressure or depression is created in order to compensate the variable mass of molten metal present in the hearth. This is not a part of the invention and is not further described.

As it can be easily understood, it is an important feature of the process according to the present invention to feed the electric furnace with hot oxidized sinter introduced at the top of the shaft, simultaneously reducing agents are introduced through the arc into the hearth. In fact, it is the high temperature of the charge which descends through the shaft which causes that the hot reducing gases rising from the hearth will bring about the beginning and a part of the reduction.

In order to obtain a sinter, the average temperature of which is the highest possible, the sintering of crushed and screened ores of a suitable dimension, on a sintering strand, is made with pre-heated oxidizing gases which pass through the charge. This sintering is made in an oxidizing atmosphere, so that the charge which is introduced into the shaft of the electric furnace is in highly oxidized condition. This procedure has a twofold advantage; first, it allows the heating of the ore on the sintering apparatus to a high temperature with a good thermic yield, and secondly, it furnishes a charge which is easily reducible and has a higher softening temperature. In fact, heating is effected under conditions which are the better when performed in an oxidizing atmosphere.

Moreover, a charge can be reduced more easily in the shaft of the furnace, if it was oxidized to maximum before it was introduced. The hot and oxidized sintered ore is, and remains during the reaction, more easily reducible than a conventional sintered ore, which has been cooled or voluntarily pre-reduced, partly due to physico chemical reasons, like the relative reducibility of different ferrous oxides, and partly for physical reasons, like the porosity of the charge which is subjected to the reduction process. While it is difficult to proceed in this manner when preparing charges for blast furnaces because it results in a friable sinter of small granulometry, nevertheless, this method, according to the present invention, is practicable and even desirable in an electric arc furnace, in view of the limited height of the shaft and the small amount of reducing gases which pass through it. On the other hand, it is advantageous to perform the oxidation and sintering of the charge in a thick layer, which improves still further the thermal yield of the pre-heating on the sintering strand. In this manner, the sinter temperature, when it leaves the sintering apparatus, will be between 800 and 1150° C.

Preferably, the oxidation will be such that we have in the sintered material a ratio $$\frac{\text{number atoms O}}{\text{number atoms Fe}}$$

higher than 1.35.

To the iron ore, before it undergoes the processes of pre-heating and sintering, there may be added a slight quantity of solid fuel. There also may be added all the necessary fluxes or slag forming additives for the subsequent formation of slag in the electric furnace, or only a part of the same, the balance being introduced directly into the hearth.

In fact, owing to the good thermal yield, it has been possible, by using pre-heated air (800° C.) and cold methane as a fuel, to perform sintering with only 3 percent coke dust incorporated in the charge.

The sintering material may be simply mixed or charged on the sintering strand in the form of pellets whose diameter may reach 25 mm. It is also possible, without going beyond the limits of the invention, to perform the sintering on an apparatus with a continuous strand, or with a number of pans operating intermittently.

The sinter cake obtained when it leaves the sintering apparatus is then dislodged, broken down and screened and introduced into the upper part of the shaft of the electric furnace. In order to make the most of the advantages offered by pre-heating in oxidizing atmosphere, the sinter should be transported from the outlet of the sintering strand to the shaft of the furnace with the least possible loss of heat. This transporting operation can be performed in insulated buckets and in a metallic conveyor inside of an insulated tunnel. As explained above, it is essential that the sinter be not cooled below its critical temperature.

It will be understood that the use of a sintering strand is described just as a mere operative example. It would be possible, without departing from the scope and spirit of the invention, to use any other agglomerating apparatus, and particularly a pelletising apparatus with a rotary kiln. In this last case, hot pellets are charged directly into the shaft of the furnace, after screening.

The reducing agents introduced in the electric arc can be liquid or gaseous hydrocarbons. The liquid hydrocarbons can be atomized, for instance, with natural gas, or air, or even pure oxygen. Atomizing fuel-oil with a moderate quantity of oxygen may be advantageous by burning a little part of the fuel at the nose of the electrode, thus liberating reducing gases and heat, whereby electric power requirements are lowered. The opportunity of doing so is mainly governed by economical factors. It is also possible to introduce in the arc gaseous hydrocarbons, natural gas for instance, with a small quantity of pulverized solid carbon in suspension, in order to adjust the ratio of hydrogen to carbon necessary for the compositions of the sinter and the end liquid metal.

It is also possible to inject a portion of gaseous hydrocarbons at the bottom of the shaft in order to facilitate the descend of the charge, but this is a simple step of convenience and is not part of the invention.

The hydrocarbons introduced into the furnace may have been cracked previously or may not have been cracked. In the event that they were not cracked previously, the cracking takes place in the apparatus, in the electric arcs. In this case, it is possible to prevent premature cracking of hydrocarbons in the pipe system or in the injectors, which premature cracking is linked with the disadvantage that it liberates powdery carbon and brings about clogging, by cooling of the hydrocarbons conveying system and thermal insulation of the injectors or pipes.

The composition of the reducing agents introduced into the electric furnace depends on the characteristics of the charge introduced into the shaft. If the charge can be reduced only with difficulty, as it is the case for instance in the production of ferro-alloys, the rate of indirect reduction (that is reduction by gases in the shaft) is low and it is necessary to introduce a large quantity of carbon in relation to the quantity of hydrogen. In this case, the quantities of carbon and hydrocarbons, which are introduced, and their composition will be regulated in a manner that the ratio by weight of hydrogen to carbon is equal at the most to 0.20. This is particularly the case for the production of ferro-manganese from manganese ores.

On the other hand, if the loads can be easily reduced a relatively larger quantity of hydrogen will be introduced. More particularly in the production of pig iron from iron bearing materials, the ratio by weight of hydrogen to carbon will be within the range of 0.15 and 0.40. For the production of steel from the same materials, this ratio will be at least equal to 0.60.

The process of the present invention allows particularly the production of high-grade pig iron, when using, in the manner described, an electric arc furnace with a charge which is pre-heated, with injection of hydrocarbons through the nose of the electrodes, in the zones of the arcs, by a method called "cold operation" which offers many advantages. This cold operation is made possible due to the particular features and advantages of my process.

In conventional electric reducing furnace operation, the cold operation cannot be carried out because the sulfur content of the pig iron would be too high and it would be impossible to control exactly the temperature at the nose of the electrodes. The uncontrollable fluctuations of this temperature around a desired average temperature set too low, could bring about catastrophic cooling of the charge, of the slag and of the metal, and could cause a complete stoppage of the apparatus.

In the hot operation, in a normal electric reducing furnace, the temperature of the melting zone at the nose of the electrodes is very high and causes substantial overheating of the slag, which in turn forms a considerable proportion of silicon obtained by reduction (the normal content of silicon in the produced pig iron varies between 1% and 2%).

In fact, in the above-described process, whether with or without previous cracking of injected hydrocarbons, the content of sulfur in the obtained metal is very low for the following reasons: first, the use of fuel containing sulfur is systematically avoided; then, the ore is desulfurized, in the sintering apparatus; finally, any small quantity of sulfur which may still remain is partially eliminated by reaction with hydrogen in the shaft of the furnace, forming hydrogen sulfide.

On the other hand, in an electric furnace with a preheated charge of ore and injection of hydrocarbons, these injections made in the electric arc, at the nose of the electrodes, bring about a cooling of this zone and limit the overheating of the slag as well as the quantity of silicon obtained by reduction. These injections of hydrocarbons can be used, more particularly, in order to regulate rapidly and almost instantaneously the operation of the furnace, correcting any irregularities. As already mentioned herein above, the perfect conditioning of the reducing agents in the electric arc, i.e. pre-heating, complete gasification and formation of monoatomic hydrogen, allows the reactions in the hearth and in the shaft to be almost instantaneous and very complete, so that no reducing material is stored in the hearth as in conventional arc smelting processes. The result is a practically instantaneous control and adjustment of the conditions in the hearth by varying the electric power in the arc or the quantity and/or composition of the injected hydrocarbons. It is accordingly permissible to operate at a low average temperature without danger of catastrophic cooling off because of the possibility of immediately correcting any disturbance.

The "cold operation" whose advantages are described above consists in controlling the feed of hydrocarbons arriving at the level of the electric arc depending on the consumed electric energy in such a manner that the "cold process" produces pig iron containing less than 0.4% of silicon. More precisely, the quantity of hydrocarbons introduced in each electrode are, at any moment, made directly proportional to the instantaneous electric power consumed by the corresponding electrode.

By varying the ratio between the quantity of the injected hydrocarbons and the electric power consumed at the electrodes, it becomes possible to control closely the thermal level of the melting zone and consequently also the content of silicon in the pig iron. However, although this condition is necessary in order to insure a satisfactory cold operation, it is not sufficient and it must be arranged, moreover, that the sinter has a minimum content of 1.5% of MnO. In order to obtain this result, it is necessary to include manganese ore in the charge fed to the sintering apparatus. In some rare cases (for instance, ore coming from Ouenza) the iron ore contains already a sufficient quantity of manganese which reaches and even surpasses the percentage of MnO given above. There is no sharp maximum value for the MnO content; however, it may be considered that more than 3.5% would be uneconomical. The manganese assures a supplementary thermal adjustment of the melting zone and makes possible a continuous cold process, which can be used in industrial installations without having to fear serious difficulties due to cooling. In case of accidental change in the thermal equilibrium of the hearth, MnO has what is known as a "buffer effect." In case of cooling, Mn is taken from the metal and oxidized to MnO, liberating heat and maintaining slag in fluid condition; in case of over-heating, MnO is reduced to Mn, absorbing heat, and the Si contact of the metal remains constant in both cases.

The device shown in FIG. 4 serves to control the flow rate of natural gas injected in the hollow electrodes of the furnace.

The flow rate of natural gas in each pipe such as pipe 21 is controlled by a valve 35 and measured by a conventional flow-meter 36 with pressure and temperature corrections. At the same time, the electric power in the arc at the nose of the corresponding electrode is measured by a wattmeter 37 connected to the cable 16 of the electrode for picking up the voltage across the arc and to an intensity transformer 38 for picking up the current intensity.

The flow-meter 36 and the wattmeter 37 give two electric signals respectively proportional to the flow rate Q of natural gas and to the electric power W. After passing these signals through adjustable attenuators 39, 40, they are respectively $l_1$ and $l_2$. One may write:

$$l_1 = k_1 Q$$
$$l_2 = k_2 W$$

These two signals are fed to a differential amplifier and regulator 41 that actuates the valve 35 for maintaining $l_1 = l_2$. The result is:

$$Q = \frac{k_2}{k_1} W$$

The electric power is measured by the wattmeter 37 with a small time constant of a few seconds, in order to integrate rapid fluctuations.

By setting attenuators 39 and 40 it is possible to adjust at will the ratio $k_2/k_1$ and to regulate rapidly the operation of the furnace, as previously stated.

In the case of the device illustrated in FIG. 3, the flow rate to be measured by flow-meter 36 and controlled by valve 35 would be the total flow-rate of cold hydrocarbons arriving at 30.

By way of illustrating example only, the characteristics of three types of operation are indicated below: cold (temperature of iron: 1350° C.), normal (temperature of iron: 1400° C.), hot (temperature of iron: 1500° C.), based on the use of ore from Ouenza for the sinter and with an indirect rate of reduction by CO and $H_2$ in the shaft in the neighborhood of 71.5%, almost constant.

| | Cold operation | Normal operation | Hot operation |
|---|---|---|---|
| Content of silicon in the pig iron, percent | .1 | .5 | 1.0 |
| Content of manganese in the pig iron, percent | 1.5 | 2.0 | 2.5 |
| Content of carbon in the pig iron, percent | 3.5 | 4.0 | 4.5 |
| Temperature in ° C | 1,350 | 1,400 | 1,500 |
| Index of basicity of slag $CaO+MgO/SiO_2+Al_2O_3$ | 1.22 | 1.38 | 1.86 |
| Volume of injected methane in cubic meters per one tone of pig iron | 245 | 252 | 261 |
| Kw.*/t. of pig iron: in the transformer: | | | |
| (a) When methane is cold | 1,339 | 1,410 | 1,506 |
| (b) When methane is hot and cracked | 791 | 846 | 924 |

*Kwh. are calculated with a yield of 70% (transformer thermal losses)

The cold operation allows to obtain a number of advantages:

(a) The consumption of electric energy is smaller, because the temperature of the pig iron and of the slag are lower, and also because the proportion of silicon and manganese obtained by reduction is lower;

(b) The consumption of electrodes is lower for the same reasons as listed under (a);

(c) The content of silicon in the pig iron is lower, which is an advantage in the further processing of the pig iron to steel;

(d) It leads to a higher ratio between the contents of manganese and silicon in pig iron, so that the slag obtained in the steel process during refining will be rich in manganese and contain little silica, which is favorable for further recovery of manganese.

In an electric furnace arranged in accordance with the present invention, the electrodes preferably are placed on the periphery of the hearth chamber around the shaft into which the charge is introduced, or alongside of it, if the shaft has an elongated configuration or if several shafts are placed in a row. The number of electrodes is such, that the reaction zones situated underneath these electrodes overlap partially so that something like a continuous crown-like area of reaction and melting is created around the shaft. The noses of the electrodes are buried in the charges but above the level of the melt and the arcs reach to the center of the mass. This operation as "immersed arcs" offers a number of advantages:

(a) The heat generated by the arc is absorbed to a great extent by the charge in the reaction zone and the calorific yield is excellent;

(b) The refractories of the hearth and the roof are protected, because the arc is surrounded by the agglomerate at a relatively low temperature and the radiation in the direction of the refractories is very limited;

(c) The diameter of the furnace may be very small for a given capacity of the shaft.

Furthermore, efforts should be made to have as little of slag as possible so that the surface of the metal is free and clear. Therefore, the level of liquid metal in the hearth should be kept constant. For this purpose a pressure receptacle or fore-hearth, as mentioned further above, should be arranged communicating with the hearth chamber of the furnace by a channel linking their lower parts. The pressure in this receptacle or fore-hearth can be varied by known means in order to keep the level of liquid metal in the hearth constant. The fore-hearth will possess at least one tap hole in order to withdraw from time to time a certain quantity of metal so that additional molten metal from the hearth chamber may be received.

The following examples are given as illustrative only of the present invention, the invention however not being limited to the specific details of the examples.

The ore used was Ouenza ore (Algeria) having the following analysis in the dry state:

Fe=54.4%                MgO=1.2%
$SiO_2$=4.5%            MnO=2.3%
CaO=5.3%                $CO_2$=5.6%
$Al_2O_3$=0.7%          $H_2O$=3.3%

In the following examples all the quantities shown are relative to one metric ton of pig iron obtained.

The ore is brought by crushing, and screening to a size of 0/8 mm. It is then intimately mixed with coke dust, of a size comprised between 0 and 4 mm.; recycled screened fines and water in the following proportions:

|  | Kg. |
|---|---|
| Wet ore | [1] 1850 |
| Recycled fines | 700 |
| Coke dust | 110 |
| Water | 200 |
| Mixture | [2] 2850 |

[1] With 7.5% moisture.
[2] With 12% moisture.

This mixture is placed on the sintering strand 1. The combustion air is sucked down at the lower portion of the strand. A row of burners ignites the mixture which burns with air, heated at 1000° C. in heat exchangers of the same type as blast furnace stoves, and arriving through hood 2. All the surface of the strand is thus fed by said hot air. About 1250 normal cubic metres are used on the strand and 250 cubic metres are lost through leaks. Consequently about 1500 normal cubic metres of air at 1000° C. are necessary for one metric ton of pig iron. For heating the heat exchangers a part of the combustible hot gases leaving the electric arc furnace are used, as commonly practised in the art.

If it is not possible to pre-heat the combustion air to a temperature high enough (not more than 700° C. for instance), this may be compensated by burning a small quantity of fuel, natural gas for instance.

At the exit of strand 1, the sinter is broken up by the device 9 and screened to obtain a size of 5 mm. by the screening device 10. In that way about 700 kg. of fines are produced which are recycled, with 1530 kg. of sinter at 950° C. having a size of 5–40 mm. and the following analysis:

|  | Percent |
|---|---|
| Fe total | 61.3 |
| $Fe^{++}$ | 7.6 |
| CaO | 4.6 |
| $SiO_2$ | 4.13 |
| $Al_2O_3$ | 0.8 |
| MgO | 1.25 |
| MnO | 3.00 |

This sinter, charged in a bucket 11 is dumped at the top of the frusto-conical shaft of the furnace. Said shaft has a capacity of P cubic metres, P being the production of the furnace in metric tons of pig iron per hour.

In the shaft, the sinter is rapidly reduced by the gases which are ascending from the hearth. The efficiency of said gases is such that at the top of the shaft the ratio of CO to $CO_2$ (by volume) is equal to 1 and the ratio of $H_2O$ to $H_2$ (by volume) is equal to 1.43. The calorific value and the volume of said gas depend from the nature of the reducing gas used in the hearth.

In that respect four examples are given in the following table, corresponding to four different reducing agents.

| Reducing Agent | Cold CH$_4$ | Hot CH$_4$ (C+2H$_2$) | Light fuel oil | Nut Coke |
|---|---|---|---|---|
| Quantity of reducing agent used: | | | | |
| M.$^3$ | 245 | 245 | | |
| Kg | | | 217 | 320 |
| Power used at the electrodes, kwh | 1,071 | 633 | 1,121 | 1,240 |
| Power used in the transformer, kwh | 1,530 | 905 | 1,600 | 1,770 |
| Analysis of pig iron, percent: | | | | |
| Si | 0.1 | 0.1 | 0.5 | 1.5 |
| Mn | 1.5 | 1.5 | 2.0 | 2.5 |
| C | 2.5 | 2.5 | 4.0 | 4.0 |
| Volume of gases produced: | | | | |
| M.$^3$N | 723 | 723 | 573 | 415 |
| CO | 12.5 | 12.5 | 24 | 50 |
| Analysis of gas, percent: | | | | |
| CO$_2$ | 12.5 | 12.5 | 24 | 50 |
| H$_2$ | 30.8 | 30.8 | 21.4 | 0 |
| H$_2$O | 44.2 | 44.2 | 30.6 | 0 |
| Ratio of indirect reduction, percent | 71.5 | 71.5 | 54.5 | 34.5 |
| Ratio hydrogen to carbon (by weight), H/C | 0.333 | 0.333 | 0.133 | 0 |

In the first example, the reducing agent is cold methane blown in the arc through the electrodes. A pig iron with a low carbon content is obtained.

In the second example, the reducing agent is methane insufflated at 925° C., which is entirely decomposed by cracking to obtain hydrogen and carbon.

In the third example the reducing agent is light fuel oil injected in the arc. The pig iron produced is hot and with a higher carbon content. The ratio of indirect reduction is lowered from 71.5% to 54.5%.

In the fourth example, given only for the sake of comparison, the reducing agent is coke and the ratio of indirect reduction is lowered to 34.5%. The pig iron is then very hot and with a high carbon content.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meeting and range of equivalence of the following claims.

What is claimed as new and desired to be secured by Letters Patent is:

1. In a process of obtaining molten ferrous metal by treatment of ferrous ore in an electric arc furnace having an upper frusto-conical shaft portion and a lower hearth portion in which the electric arc is formed between electrodes the forward ends of which extend into said lower hearth portion and at least one of which is a hollow electrode opening into said lower hearth portion, the steps of forming a particulate mixture of ferrous ore and slag-forming material; heating the thus formed particulate mixture to sintering temperature under oxidizing conditions to obtain a hot sintered oxidized charge having a temperature within the range of between about 800° C. and 1150° C.; introducing said hot charge without appreciable loss of heat into said upper frusto-conical shaft portion; allowing said charge to pass downwardly through said shaft portion and into said hearth portion of said furnace in countercurrent flow to hot reducing gases passing upwardly from said lower hearth portion so as to provide intimate contact between said hot reducing gases and said charge thereby partially reducing said charge in said upper shaft portion before the same reaches said hearth portion; injecting through said hollow electrode into said lower hearth portion a reducing agent selected from the group consisting of hydrocarbons and decomposition products thereof obtained by cracking said hydrocarbons, so as to complete reduction of said charge to molten metal in said hearth portion in contact with said reducing agent and while subjecting said charge to an electric arc thereby separating said charge into slag and molten ferrous metal and carburizing the latter in said hearth; and separating the thus obtained molten ferrous metal from said slag.

2. A process according to claim 1, wherein the molten ferrous metal in the hearth is maintained at a constant level.

3. A process according to claim 1, for producing pig iron wherein said charge is iron bearing material and wherein the ratio by weight of hydrogen to carbon in said reducing agent is within the range of between 0.15 and 0.40.

4. A process according to claim 1, for producing steel wherein said charge is iron bearing material and wherein the ratio by weight of hydrogen to carbon in said agent is equal to at least 0.60.

5. A process according to claim 1, for producing ferromanganese wherein said charge is iron and manganese bearing material and wherein the ratio by weight of hydrogen to carbon in said reducing agent is equal to up to 0.20.

6. A process according to claim 1, for producing ferronickel wherein said charge is iron and nickel bearing material and wherein the ratio by weight of hydrogen to carbon in said reducing agent is equal to at least 0.60.

7. A process according to claim 1, wherein the rate of flow of said reducing agent at the arc level is adjusted relative to the electric power simultaneously consumed by said electrode so as t maintain a constant ratio between said rate of flow and said electric power.

8. A process according to claim 1, wherein said reducing agent is injected into the hearth portion through and near the forward end of at least one arc-forming electrode and consists of at least one hydrocarbon, and wherein the rate of flow of said reducing agent at the arc level is adjusted relative to the electric power simultaneously consumed by said electrodes so as to maintain constant the ratio between said rate of flow and said electric power.

9. A process according to claim 7, wherein said ratio between rate of flow of reducing agent at the arc level and electric power simultaneously consumed by said electrode is varied for adjusting the operation of the process at the desired thermic level and for compensating any accidental perturbation.

10. A process according to claim 7, wherein said hot sintered oxidized charge includes MnO in the range 1.5% to 3.5%.

11. A process according to claim 1, wherein the reducing agent injected into the hearth portion of the electric furnace is produced by thermal cracking of hydrocarbon, said cracking being carried out in at least two chambers of regenerator type, which chambers are used alternatively for the heating phase and for the cracking phase, and wherein the varying temperatures of the products of cracking injected into the hearth portion of the electric furnace are compensated by injection of cold hydrocarbons through at least one of said arc-forming electrodes in variable quantities depending on the temperature of the simultaneously introduced cracked gases, the amount of the thus injected cold hydrocarbons being controlled in such a manner as to maintain constant both total rate of flow of reducing agent injected and sensible heat thereof.

No references cited.

DAVID L. RECK, *Primary Examiner.*

H. F. SAITO, *Assistant Examiner.*